US 8,913,207 B2

(12) United States Patent
Watanabe

(10) Patent No.: US 8,913,207 B2
(45) Date of Patent: Dec. 16, 2014

(54) DISPLAY DEVICE

(75) Inventor: Saburo Watanabe, Chosei-gun (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 779 days.

(21) Appl. No.: 13/173,121

(22) Filed: Jun. 30, 2011

(65) Prior Publication Data

US 2012/0002130 A1  Jan. 5, 2012

(30) Foreign Application Priority Data

Jun. 30, 2010 (JP) ................. 2010-148569

(51) Int. Cl.
*G02F 1/1333* (2006.01)
*F21V 8/00* (2006.01)

(52) U.S. Cl.
CPC .......... *G02F 1/133308* (2013.01); *G02F 2001/133317* (2013.01); *G02F 2201/54* (2013.01); *G02B 6/0088* (2013.01)
USPC .................. 349/58; 349/62; 349/60

(58) Field of Classification Search
CPC .......... G02F 1/133608; G02F 1/133308; G02F 1/133615; G02F 1/133606; G02F 1/133504; G02F 1/1336; G02F 2001/133317; G02F 2001/133314; G02F 1/133325; G02F 1/133328; G02F 2201/46; G02F 2201/465; G02F 2201/54; G02F 2201/503; G02B 6/0088; G02B 6/005; G02B 6/0093; G02B 6/0053; G02B 6/0065; G09F 15/0018
USPC .......... 349/58, 65, 61, 62, 60, 64; 362/633, 362/97.1, 632, 362, 433, 457, 561, 600, 362/602, 634; 348/E5.128, 790
See application file for complete search history.

(56) References Cited

U.S. PATENT DOCUMENTS

| 7,578,609 | B2 * | 8/2009 | Chang et al. ............ 362/633 |
| 2002/0024623 | A1 | 2/2002 | Kim et al. |
| 2002/0072174 | A1 | 6/2002 | Sandhu et al. |
| 2003/0128307 | A1 * | 7/2003 | Ito et al. .................. 349/58 |
| 2010/0321604 | A1 * | 12/2010 | Choi et al. ............... 349/58 |

FOREIGN PATENT DOCUMENTS

| JP | 2002-72174 | 3/2002 |
| JP | 2008-027736 | 2/2008 |
| JP | 2008-112663 | 5/2008 |
| JP | 2008-243402 | 10/2008 |
| WO | WO 2007/049379 | 5/2007 |

OTHER PUBLICATIONS

Partial translation of Office Action in corresponding Japanese Patent Application No. 2010-148569 dated Jan. 28, 2014.

* cited by examiner

*Primary Examiner* — Thoi Duong
(74) *Attorney, Agent, or Firm* — Antonelli, Terry, Stout & Kraus, LLP.

(57) ABSTRACT

Provided is a display device, including: a first protrusion formed to an inner side surface of one of side walls of the frame on a short side of an angled corner portion surrounded by the side walls; a second protrusion formed to an inner side surface of one of the side walls on a long side of the angled corner portion; and a third protrusion formed at another angled corner portion on another end side of at least one of the side walls sharing the angled corner portion provided with the first and second protrusions, and formed to an inner side surface of one of the side walls that is opposed to the side wall to which the first protrusion and/or the second protrusion are/is arranged, the optical sheet including cut-out first to third recesses which are to be fitted to the first to third protrusions.

8 Claims, 10 Drawing Sheets

DISPLAY DEVICE

CROSS-REFERENCE TO RELATED APPLICATION

The present application claims priority from Japanese application JP 2010-148569 filed on Jun. 30, 2010, the content of which is hereby incorporated by reference into this application.

BACKGROUND OF THE INVENTION

1. Field of the Invention

The present invention relates to a display device.

2. Description of the Related Art

In recent years, along with an improvement of display performance of a liquid crystal display device, a display device is being actively used as an in-car display device. However, the in-car display device needs to cope with an environment for use of a car and to allow use under high temperature and low temperature, and is required to operate in a wide temperature range (use temperature range). Similarly, the in-car display device is required to have high vibration resistant performance so as to prevent looseness of assembly of components from occurring along with vibration of a car and the like.

As the technology of forming such a display device suitable for in-car use, for example, there is known the backlight unit described in JP 2008-27736 A. In the technology described in JP 2008-27736 A, the protrusions are formed on the inner side wall surfaces of the metal frame by molding a part of the metal frame serving as the case of the backlight unit. With this configuration, the light guide plate to be accommodated in the metal frame is fixed using elastic forces of the protrusions.

Further, the plurality of optical sheets such as diffusion sheets for uniformly diffusing the backlight emitted from the light guide plate are arranged on the light emitting surface side of the light guide plate. The optical sheets are generally fixed by being sandwiched between the light guide plate and the frame. As the technology of fixing the optical sheets, for example, there is known the liquid crystal display device described in JP 2002-72174 A. In the technology described in JP 2002-72174 A, the shaft provided with the protrusion is arranged on the short side of the frame made of plastics or metal, and the protrusion of the shaft is caused to pass through holes formed in the optical sheets, thereby fixing the optical sheets.

In addition, as illustrated in FIG. 18 and FIG. 19, there is known a configuration in which a plurality of rubber cushion members 2 are arranged between a light guide plate 1 and side walls of a lower frame 3 and between an optical sheet 4 and the side walls of the lower frame 3 to alleviate movement of the light guide plate 1 and the optical sheet 4 due to vibration by the rubber cushion members 2. In this configuration, the rubber cushion members 2 are fixed to three sides of the lower frame 3 excluding a side on the lower side of FIG. 18 or FIG. 19 at which a light source (not shown) is arranged.

In the technology described in JP 2008-27736 A, the light guide plate is pressed onto the side wall surfaces of the metal frame by spring elasticity of the protrusions, thereby holding the light guide plate. However, the light guide plate is formed of a transparent member made of an acrylic resin or the like, and hence there is a problem in that the light guide plate is chipped off because of rubbing between the end portion of the metal frame and the light guide plate due to vibration, and in a case where the chips enter the illumination surface illuminated with the backlight, a display quality of the liquid crystal display device is deteriorated. Further, when compared to the metal frame, the light guide plate made of a resin material has a larger coefficient of thermal expansion, and hence there is also a problem in that the light guide plate has a large amount of expansion particularly under high temperature and a large force is applied to the protrusions of the metal frame, thereby causing deformation of the light guide plate.

Further, in order to provide vibration resistant performance of the optical sheets using the technology described in JP 2002-72174 A, it is necessary to arrange the shafts at the opposed short sides of the frame, respectively, and to fix the optical sheets from both sides thereof using the two shafts. Meanwhile, the frame, which corresponds to a region surrounding the display region, does not contribute to image display, and hence is required to be narrowed. Thus, in the technology described in JP 2002-72174 A, the extended portion extended outward is formed at the center portion of the edge side on each side (short side) of the optical sheet, and the hole for allowing the protrusion of the shaft to pass therethrough is formed in the extended portion. Accordingly, in the technology described in JP 2002-72174 A, there is a fear in that the force applied to the optical sheets is concentrated on the extended portion, and because only the extended portion protrudes from the short side of the optical sheet, damage and wrinkles occur in the extended portion in a concentrated manner.

In addition, in the conventional configuration illustrated in FIG. 18 and FIG. 19, as illustrated in an enlarged view of FIG. 20, a clearance (gap formed considering expansion and contraction) corresponding to amounts of expansion and contraction of the light guide plate 1 and the optical sheet 4 due to temperature change is formed in advance. However, expansion coefficients of the optical sheet 4 and the light guide plate 1 made of a resin are approximately 4 to 6 times as large as that of the lower frame 3 or the like made of metal, and hence it is necessary to increase the clearance involved with temperature change in a longitudinal direction. Therefore, there is a fear in that backlash, damage, and the like accompanied with looseness and the like of the light guide plate 1 and the optical sheet 4 occur.

SUMMARY OF THE INVENTION

The present invention has been made in view of the above-mentioned problems, and it is therefore an object of the present invention to provide a display device capable of preventing damage of the optical sheet and occurrence of wrinkles.

It is another object of the present invention to provide a display device capable of preventing backlash of the light guide plate.

In order to solve the above-mentioned problems, there is provided a display device, including: a display panel for displaying an image; a light guide plate, which is arranged on a back surface side of the display panel, and has one flat surface as a light emitting surface to allow light of a light source entering from an end surface of the light guide plate to be emitted; an optical sheet, which is arranged on the light emitting surface side of the light guide plate; a frame formed into a box shape with one open surface, for holding the light guide plate and the optical sheet; a first protrusion formed to an inner side surface of one of side walls of the frame on a short side of an angled corner portion surrounded by the side walls; a second protrusion formed to an inner side surface of one of the side walls on a long side of the angled corner portion; and a third protrusion formed at another angled corner portion on another end side of at least one of the side walls sharing the angled corner portion provided with the first and second protrusions, and formed to an inner side surface of one of the side walls that is opposed to the side wall to which the first protrusion and/or the second protrusion are/is arranged, the optical sheet including, in its side edge portions, cut-out first to third recesses which are to be fitted to the first to third protrusions.

According to the present invention, even when used for in-car use to undergo sharp temperature change and receive intense vibration, the display device can prevent damage of the optical sheet and occurrence of wrinkles. Further, the display device can prevent backlash of the light guide plate.

Other effects of the present invention are clearly described in the description of the entire specification.

DETAILED DESCRIPTION OF THE INVENTION

Hereinafter, embodiments to which the present invention is applied are described with reference to the drawings. Note that, in the following description, the same components are denoted by the same reference symbols, and repeated description is omitted.

Embodiment 1

Entire Configuration of Backlight Device

Figure 1:
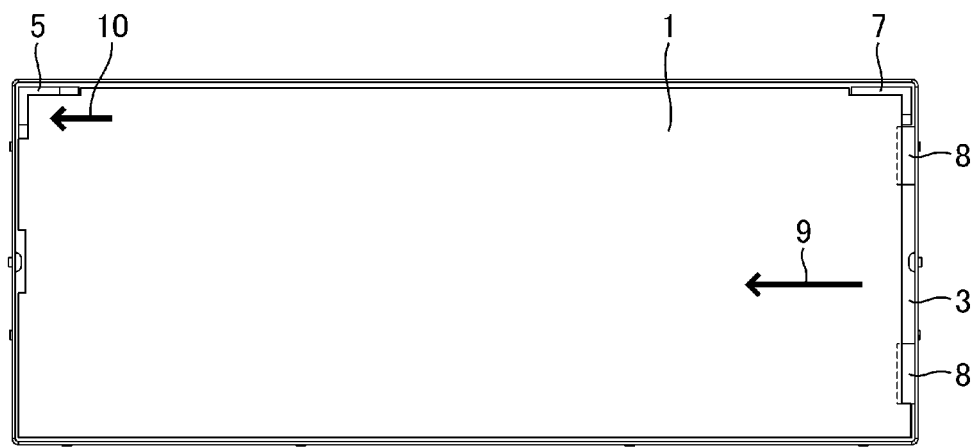
FIG. 1 is a top view illustrating a schematic configuration of a backlight device of a display device according to Embodiment 1 of the present invention.

FIG. 1 is a top view illustrating a schematic configuration of a backlight device of a display device according to Embodiment 1 of the present invention, and more particularly, a view illustrating a fixed structure of a light guide plate of the backlight device according to Embodiment 1. Note that, an upper frame arranged on an illumination side of backlight and fitted to a lower frame, and an optical sheet arranged on an illumination side of the light guide plate are omitted.

As is apparent from FIG. 1, the display device according to Embodiment 1 is an in-car display device that has long sides longer than short sides, in other words, has a display region with a higher aspect ratio than an aspect ratio (16:9) of a wide screen. However, the invention of the subject application is not limited to the display device with a high aspect ratio, but is also applicable to a display device with another aspect ratio.

Further, in the backlight device according to Embodiment 1, a light guide plate 1 is pressed and fixed onto one of the short sides of a rectangular lower frame 3 made of metal such as aluminum. In Embodiment 1, the light guide plate 1 is pressed onto the short side on the left side of FIG. 1. Further, the lower frame 3 according to Embodiment 1 has a box shape in which an illumination surface side illuminated with the backlight is open, and has a height of a side wall portion corresponding to a height of the light guide plate 1 and a height of a plurality of optical sheets (not shown). Further, in Embodiment 1, description is made of a backlight device of a so-called side light system in which a light source (not shown) is arranged on the lower side of FIG. 1, i.e., on a lower side surface portion of the display device. Therefore, in the backlight device according to Embodiment 1, an L-shaped first locking member 5 and second locking member 7 according to the invention of the subject application are arranged at corner portions, i.e., both end portions of the long side on the upper side of FIG. 1, which is the long side on which the light source is not arranged. Note that, the first locking member 5 and the second locking member 7 are described in detail below.

Further, in the backlight device according to Embodiment 1, rubber cushion members 8 each made of an elastic body such as silicone rubber are arranged at the short side on the right side of FIG. 1, and the light guide plate 1 is pressed and fixed onto the short side on the left side of FIG. 1 by elastic forces of the rubber cushion members 8. Specifically, in the backlight device according to Embodiment 1, in a gap between a side wall of the lower frame 3 at the short side on the right side of FIG. 1 and the light guide plate 1, the rubber cushion members 8 larger in size than a width of the gap are arranged. With this configuration, the light guide plate 1 is pressed and fixed in a direction indicated by an arrow 9 by stress (compressive stress, elastic force) that deforms (distorts) the rubber cushion members 8 and returns the rubber cushion members 8 to, for example, positions indicated by the dotted lines of FIG. 1.

At this time, in the backlight device according to Embodiment 1, the first locking member 5, which is arranged at an angled corner portion on the upper left side of FIG. 1 of the corner portions (angled corner portions each being a portion at which the short side and the long side intersect) of the lower frame 3, is sandwiched between the side walls of the lower frame 3 and the light guide plate 1. Specifically, with the compressive stress of the rubber cushion members 8 in a direction of the arrow 9 for pressing the light guide plate 1 onto the short side of the lower frame 3, the first locking member 5 is sandwiched between the side wall portion of the lower frame 3 and the light guide plate 1, thereby fixing the first locking member 5 at a predetermined position of the lower frame 3. Note that, the first locking member 5 may be fixed directly to the lower frame 3 using a well-known method.

Meanwhile, the second locking member 7 is arranged at the corner portion (angled corner portion being a portion at which the short side and the long side intersect) on the upper right side of FIG. 1 of the lower frame 3. In Embodiment 1, the second locking member 7 is fixed directly to the angled corner portion of the lower frame 3. Specifically, in the backlight device according to Embodiment 1, as indicated by the arrow 9 and an arrow 10 of FIG. 1, the compressive stress of the rubber cushion members 8 is applied in a direction of the short side on the left side of FIG. 1, the short side on the left side thereof being used as a reference position of the lower frame 3. Thus, the compressive stress is not applied to the second locking member 7 arranged at the angled corner portion at the short side on which the rubber cushion members 8 are arranged. Therefore, in Embodiment 1, the second locking member 7 is fixed directly to the lower frame 3.

Figure 2:
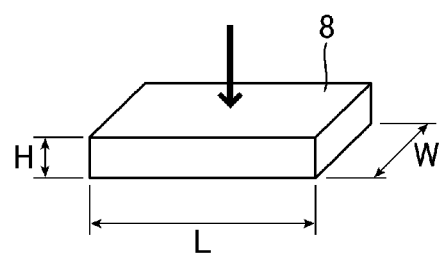
FIG. 2 is a view illustrating a shape of a rubber cushion member of the display device according to Embodiment 1 of the present invention.
Figure 3:
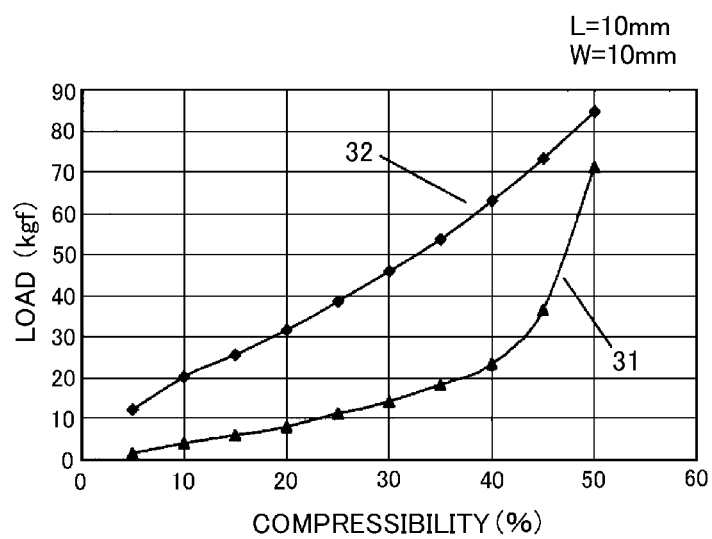
FIG. 3 is a graph illustrating compressibility-to-load characteristics of the rubber cushion member of the display device according to Embodiment 1 of the present invention.

FIG. 2 is a view illustrating a shape of the rubber cushion member of the display device according to Embodiment 1 of the present invention, and FIG. 3 is a graph illustrating compressibility-to-load characteristics of the rubber cushion member of the display device according to Embodiment 1 of the present invention. Note that, in FIG. 2, W represents a width of the rubber cushion member; L, a length thereof; and H, a height thereof.

As illustrated in FIG. 2, in Embodiment 1, by using the rubber cushion members 8 each formed of the rectangular-parallelepiped-shaped elastic body made of silicone rubber, the light guide plate 1 is fixed. In the rubber cushion member 8 illustrated in FIG. 2, a surface on the upper side of FIG. 2 is arranged opposed to a side surface of the light guide plate, to thereby press the side surface of the light guide plate. Further, a surface on the lower side of FIG. 2 is arranged opposed to the side surface of the lower frame, to thereby press the side wall of the lower frame.

It is desired to use, as the rubber cushion member 8 according to Embodiment 1 configured as described above, silicone rubber in which load (compressive load) to compressibility shows nonlinear characteristics as indicated by, for example, a solid line 31 of FIG. 3. When compared to a case of using silicone rubber in which compressibility and load change proportionally as indicated by a solid line 32, using the silicone rubber having such characteristics can reduce load on the light guide plate, which results from a difference of thermal expansion between the light guide plate and the lower frame due to temperature change. In addition, when compared to a conventional backlight device described below, the backlight device according to Embodiment 1 has a configuration in which the light guide plate is constantly pressed onto the side wall of the lower frame, and hence the load is low. However, the load of the silicone rubber used as the rubber cushion member 8 according to Embodiment 1 differs in acceleration that occurs at the time of occurrence of vibration depending on a weight of the light guide plate, and hence the load of the silicone rubber is changed as needed depending on the weight of the light guide plate. Note that, the characteristics shown in FIG. 3 represent a case where the length L of the silicone rubber is 10 mm and the width W of the silicone rubber is 10 mm. Further, the shape of the rubber cushion member 8 is not limited to a rectangular-parallelepiped shape, but may be another columnar shape.

[Fixed Structure of Optical Sheet]

Figure 4:
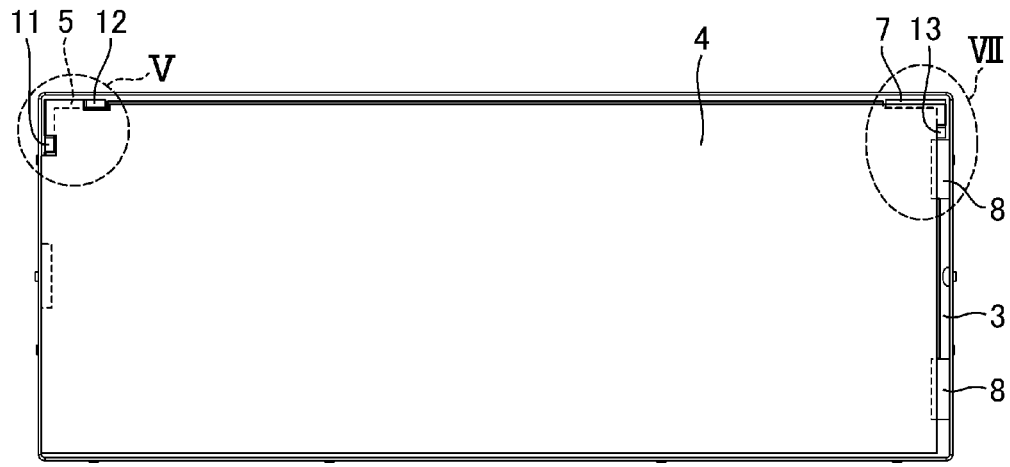
FIG. 4 is a view illustrating a fixed structure of an optical sheet of the display device according to Embodiment 1 of the present invention.
Figure 5:
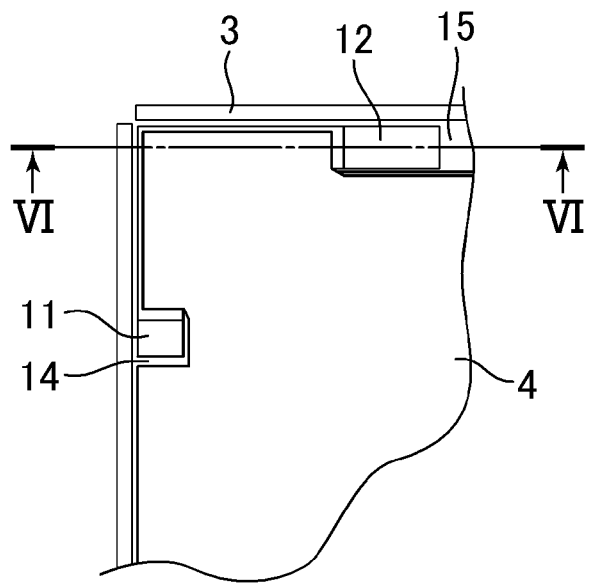
FIG. 5 is an enlarged view of a circle V illustrated in FIG. 4.
Figure 6:
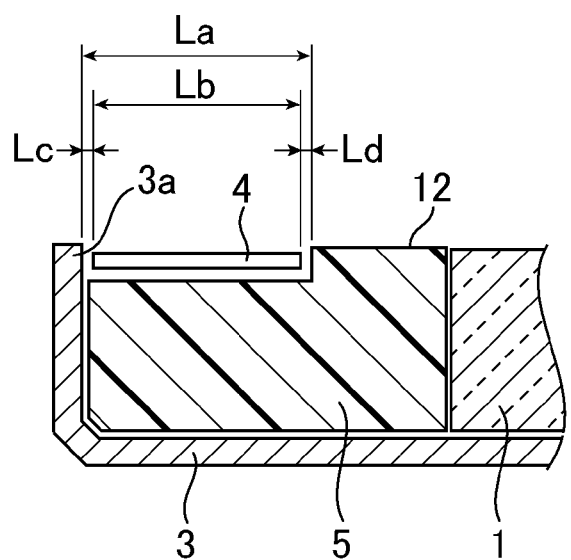
FIG. 6 is a sectional view taken along the line VI-VI of FIG. 5.
Figure 7:
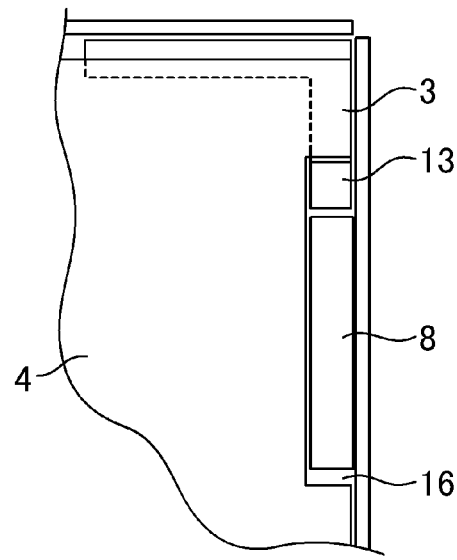
FIG. 7 is an enlarged view of a circle VII illustrated in FIG. 4.

FIG. 4 is a view illustrating a fixed structure of an optical sheet of the display device according to Embodiment 1 of the present invention. FIG. 5 is an enlarged view of a circle V illustrated in FIG. 4. FIG. 6 is a sectional view taken along the line VI-VI of FIG. 5. FIG. 7 is an enlarged view of a circle VII illustrated in FIG. 4. Hereinafter, a detailed configuration of the backlight device according to Embodiment 1 is described with reference to FIG. 4 to FIG. 7. Note that, in FIG. 4, the upper frame to be fitted to the lower frame and the light guide plate are omitted. Further, as described in detail below, in Embodiment 1, first to third protrusions formed on the first and second locking members protrude to the illumination surface side from a height of the surface of the light guide plate. In addition, the optical sheet according to Embodiment 1 includes a plurality of well-known optical sheets such as diffusion sheets for diffusing the backlight emitted from the light guide plate.

As illustrated in FIG. 4, in an optical sheet 4 of the backlight device according to Embodiment 1, cut-out recesses 14, 15 are formed respectively at positions corresponding to a first protrusion 11 and a second protrusion 12 formed on the first locking member 5. Further, a cut-out recess 16 is formed at a position corresponding to a third protrusion 13 formed on the second locking member 7.

At this time, in the backlight device according to Embodiment 1, the L-shaped first locking member 5 and second locking member 7 are arranged along inner side surfaces of the side walls of the lower frame 3, and hence a protruding amount to an illumination region of the backlight can be reduced. In addition, the first locking member 5 and the second locking member 7 are arranged at the angled corner portions, and hence an influence on another component such as the light source (not shown) can be reduced.

Here, in the substantially L-shaped first locking member 5 according to Embodiment 1, the first protrusion 11 is formed on the side arranged along the short side direction of the lower frame 3, and the second protrusion 12 is formed on the side arranged along the long side direction of the lower frame 3. Further, the second locking member 7 is also formed into a substantially L-shape, but in the second locking member 7, only the third protrusion 13 is formed on the side on which the second locking member 7 is arranged along the short side direction of the lower frame 3. Further, positions at which the first protrusion 11 to the third protrusion 13 are formed are shifted due to an influence of ambient temperature depending on the optical sheet 4 and constituent materials for the first locking member 5 and the second locking member 7. Therefore, in the backlight device according to Embodiment 1, in order to significantly reduce the influence of ambient temperature, in consideration of mechanical strength of the optical sheet 4, the optical sheet 4 is fixed so that a distance from the angled corner portion, i.e., the long side to the first protrusion 11, and a distance from the angled corner portion, i.e., the short side to the second protrusion 12 are made small as needed. This can reduce a clearance, and prevent positional shift of the optical sheet 4 due to vibration and the like. In addition, in the backlight device according to Embodiment 1, the third protrusion 13 provided on the second locking member 7 prevents the positional shift and the like of the optical sheet 4 in the short side direction on the other end side of the long side of the lower frame 3. With this configuration, without reducing working efficiency for assembly of the backlight device, it is possible to prevent occurrence of the positional shift, torsion, and the like of the optical sheet 4.

In addition, in the configuration of Embodiment 1, the first protrusion 11 to the third protrusion 13 being the plurality of protrusions bear the positional shift of the optical sheet 4 due to vibration, and the side walls of the lower frame 3 are used. Thus, the load to be applied to the optical sheet 4 depending on a moving direction can be received by different parts, and the stress to be applied to the optical sheet 4 can be distributed. As a result, it is possible to attain such a special effect as to be capable of preventing a reduction in display performance under a vibration application state.

[Detailed Configurations of First and Second Locking Members]

Next, with reference to FIG. 5 and FIG. 6, an operation of locking the optical sheet 4 by the first and second protrusions in the backlight device according to Embodiment 1 and configurations of the cut-out recesses are described in detail.

As illustrated in FIG. 5, in Embodiment 1, the optical sheet 4 is arranged on a top surface portion of the first locking member 5 excluding a region in which the first protrusion 11 and the second protrusion 12 are formed. Specifically, the optical sheet 4 according to Embodiment 1 has a size along the lower frame 3. Thus, in a region excluding the recess 14 of the optical sheet 4 corresponding to the first protrusion 11, the recess 15 of the optical sheet 4 corresponding to the second protrusion 12, and portions for arranging the rubber cushion members, side edge portions of the optical sheet 4 are along inner surfaces of the side walls of the lower frame 3.

In the backlight device according to Embodiment 1, a side wall surface on the corner portion side (left side of FIG. 5) of the second protrusion 12 and the side edge portion of the recess 15 of the optical sheet 4 prevent the positional shift of the optical sheet 4 to the right side of FIG. 5, the side edge portion being opposed to the side wall surface. Meanwhile, the side wall (side wall onto which the light guide plate is pressed) on the short side of the lower frame 3 prevents the positional shift of the optical sheet 4 to the left side of FIG. 5.

Specifically, as illustrated in FIG. 6, a portion of the optical sheet 4 positioned in a region formed between an inner surface portion 3a of the side wall of the lower frame 3 and the second protrusion 12, in other words, a portion of the optical sheet 4 positioned in a region overlapping the top surface of the first locking member 5 is fixed by the second protrusion 12 and the side wall of the lower frame 3. This configuration prevents the positional shift of the optical sheet 4 in an extending direction of the long side of the lower frame 3 (right-left direction of FIG. 6). In this case, as illustrated in FIG. 6, in a case where La represents a distance from the inner side portion 3a of the side wall of the lower frame 3 to a corner side surface of the second protrusion 12, Lb represents a width of the optical sheet 4 corresponding to the region, Lc represents a distance from the inner side surface of the side wall of the lower frame 3 to an end portion on the corner portion side of the optical sheet 4, and Ld represents a distance from the corner side surface of the second protrusion 12 to an end portion on the second protrusion 12 side of the optical sheet 4, a relation La=Lb+Lc+Ld is established. Therefore, a length (La−Lb=Ld+Lc) obtained by subtracting the width of the optical sheet 4 arranged to overlap the region from the distance La between the side wall of the lower frame 3 and the second protrusion 12 corresponds to a maximum value of an amount of the positional shift of the optical sheet in the long side direction due to vibration.

Here, the first locking member 5 and the optical sheet 4 expand and contract according to expansion coefficients of employed materials due to temperature change. Meanwhile, in Embodiment 1, the second protrusion 12 is formed at the corner portion, and hence it is possible to reduce the distance La from the inner side surface of the side wall of the lower frame 3 to the corner side surface of the second protrusion 12 and the width Lb of the optical sheet 4 corresponding to the region, and also possible to significantly reduce amounts of change in the distance La and the width Lb of the optical sheet due to temperature change. As a result, the clearance Ld+Lc, which is the gap provided for absorbing expansion and contraction of the first locking member 5 and the optical sheet 4 due to the temperature change, can be made small, and hence it is possible to prevent the positional shift of the optical sheet 4 in the long side direction, which is caused by the clearance.

Further, in the backlight device according to Embodiment 1, the side surface on the corner portion side (upper side of FIG. 5) of the first protrusion 11 and the side edge portion on the corner portion side of the side edge portions of the cut-out recess 14 prevent the positional shift of the optical sheet 4 in a downward direction of FIG. 5. Meanwhile, the side wall on the long side of the lower frame 3 prevents the positional shift of the optical sheet 4 in an upward direction of FIG. 5. With this configuration, similarly to the above-mentioned second protrusion 12, it is possible to reduce the distance from the side wall of the lower frame 3 to the side surface of the first protrusion 11 and the width of the optical sheet 4 corresponding to the region. As a result, amounts of change in formation position of the first protrusion 11 and width of the optical sheet due to temperature change can be also made extremely small, and hence the formation position of the first protrusion 11 and the clearance for absorbing expansion and contraction of the optical sheet 4 due to temperature change can be also formed small. Therefore, it is possible to prevent the positional shift of the optical sheet 4 in the short side direction, which is caused by the clearance.

At this time, in Embodiment 1, with reference to FIG. 5, the distance from the short side of the lower frame 3 to the second protrusion 12 is larger than the distance from the long side of the lower frame 3 to the first protrusion 11. With this configuration, the load that the optical sheet 4 receives from the first protrusion 11 and the second protrusion 12 at the time of vibration is distributed. Note that, the distance from the long side of the lower frame 3 to the first protrusion 11 and the distance from the short side of the lower frame 3 to the second protrusion 12 may be the same, or the distance from the long side of the lower frame 3 to the first protrusion 11 may be larger than the distance from the short side of the lower frame 3 to the second protrusion 12.

As illustrated in FIG. 4, in the backlight device according to Embodiment 1, of the two side walls sharing the angled corner portion at which the first locking member 5 is formed, at the angled corner portion on the other end of the side wall on the long side, the second locking member 7 is arranged. The second locking member 7 to be arranged at the angled corner portion is also a substantially L-shaped locking member made of a resin material, and is fixed on the inner surface side of the side walls of the lower frame 3. At this time, in Embodiment 1, at the end portion of the second locking member 7 on the side arranged along the short side, the third protrusion 13 that protrudes in an illumination direction of the backlight is formed. Further, in the optical sheet 4, the cut-out recess 16 corresponding to the third protrusion 13 is formed. In particular, in Embodiment 1, the recess 16 is shaped so as to include a region in which the rubber cushion member 8 is arranged. At this time, in order to cope with expansion and contraction of the optical sheet 4 in a longitudinal direction due to temperature change, the recess 16 is formed to be larger than the width of the third protrusion 13 illustrated in FIG. 7, and is shaped so as to have a predetermined clearance even when the optical sheet 4 has a high temperature.

The second locking member 7 according to Embodiment 1 is arranged at the angled corner portion on the other end side of the same long side as that on which the first locking member 5 is arranged. In addition, similarly to the first protrusion 11, the third protrusion 13 is formed at a position close to the long side of the lower frame 3, and hence an amount of expansion and contraction of the optical sheet 4 due to temperature change can be minimized. That is, in Embodiment 1, the side wall of the third protrusion 13 on the upper side of FIG. 7 and the side edge portion of the recess 16 on the upper side of FIG. 7, and the side walls in the longitudinal direction (long side direction) of the lower frame 3 and the side edge portions in the longitudinal direction (long side direction) of the optical sheet 4 prevent the optical sheet 4 on the side on which the second locking member 7 is arranged from moving in a lateral direction (short side direction), that is, from moving in the lateral direction (short side direction) of the backlight device. Further, with this configuration, it is also possible to prevent torsion of the optical sheet 4 on the second locking member 7 side.

As described above, in Embodiment 1, the optical sheet 4 is arranged on the top surface portion of the second locking member 7 excluding the region in which the third protrusion 13 is formed. At this time, the optical sheet 4 according to Embodiment 1 has a size along the lower frame 3. Therefore, in the region excluding the rubber cushion members 8 and the cut-out recess 16 of the optical sheet 4 corresponding to the third protrusion 13, the side edge portions of the optical sheet 4 are arranged along the side walls of the lower frame 3.

Therefore, in the backlight device according to Embodiment 1, similarly to fixing of the optical sheet 4 with the first protrusion 11, the side wall surface on the corner portion side (upper side of FIG. 7) of the third protrusion 13 and the side edge portion on the corner portion side of the side edge portions of the cut-out recess 16 prevent the positional shift of the optical sheet 4 to the lower side of FIG. 7. Meanwhile, the side wall on the long side of the lower frame 3 prevents the positional shift of the optical sheet 4 to the upper side of FIG. 7. At this time, similarly to the above-mentioned fixing of the optical sheet 4 with the first locking member 5, a portion of the optical sheet 4 overlapping the second locking member 7 is extremely small, and hence the amount of expansion and contraction of the optical sheet 4 due to temperature change can be set to an extremely small value.

Meanwhile, the amount of expansion and contraction of the optical sheet 4 due to temperature change at the formation position of the third protrusion 13 depends on a length in the long side direction of the display device. Therefore, in the optical sheet 4 according to Embodiment 1, the size of the cut-out recess 16 with respect to the longitudinal direction of the optical sheet 4 is set considering at least the amount of expansion and contraction in the longitudinal direction of the optical sheet 4 due to temperature change. Specifically, in the cut-out recess 16 of the optical sheet 4 according to Embodiment 1, with respect to the longitudinal direction of the optical sheet 4, which corresponds to the right-left direction of FIG. 7, the cut-out recess 16 is formed to have a cut-out amount that is set to be larger than the size in the right-left direction of the third protrusion 13 with a margin. The amount of the margin at this time is set considering the amounts of expansion and contraction of the optical sheet 4 and the lower frame 3 due to temperature change, formation accuracy of the cut-out recess 16 and the third protrusion 13, and the like.

[Fixing Procedures for Optical Sheet]

Figure 8:
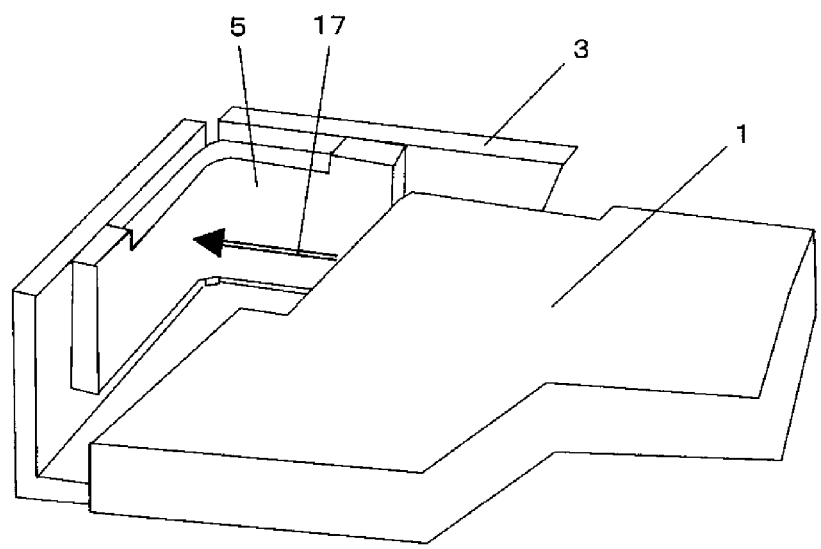
FIG. 8 is a view illustrating an assembly procedure for the optical sheet of the backlight device of the display device according to Embodiment 1 of the present invention.
Figure 9:
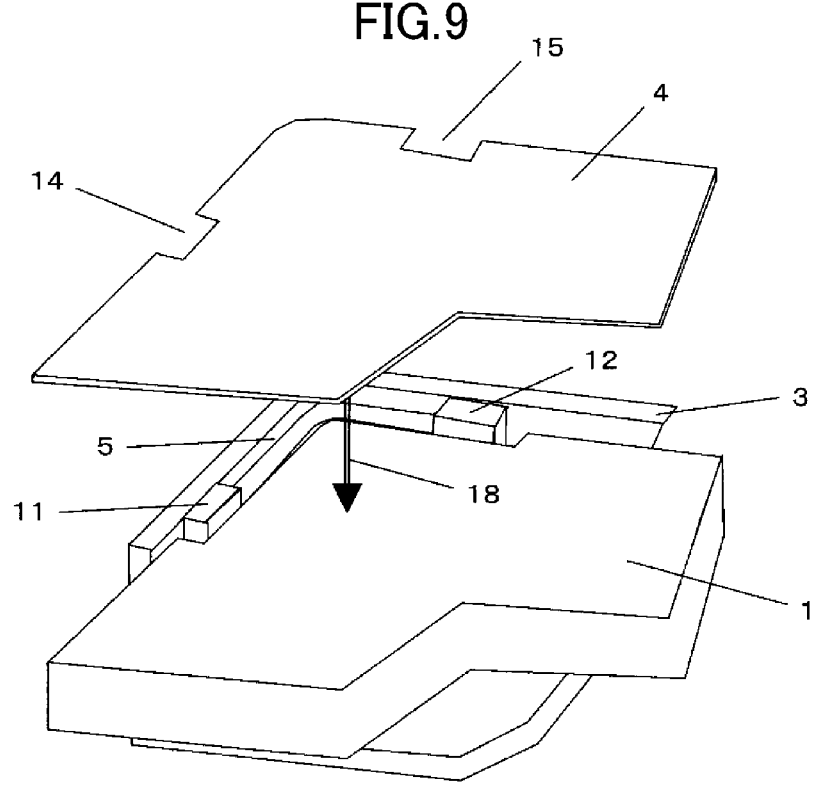
FIG. 9 is a view illustrating an assembly procedure for the optical sheet of the backlight device of the display device according to Embodiment 1 of the present invention.
Figure 10:
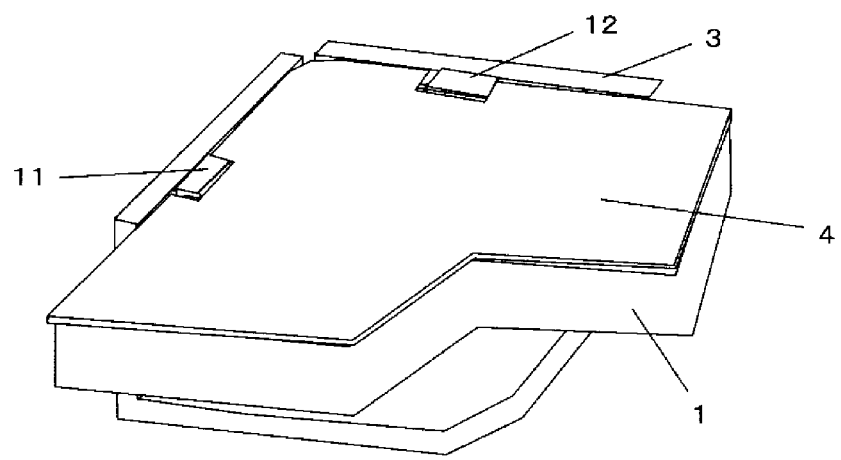
FIG. 10 is a view illustrating an assembly procedure for the optical sheet of the backlight device of the display device according to Embodiment 1 of the present invention.
Figure 11:
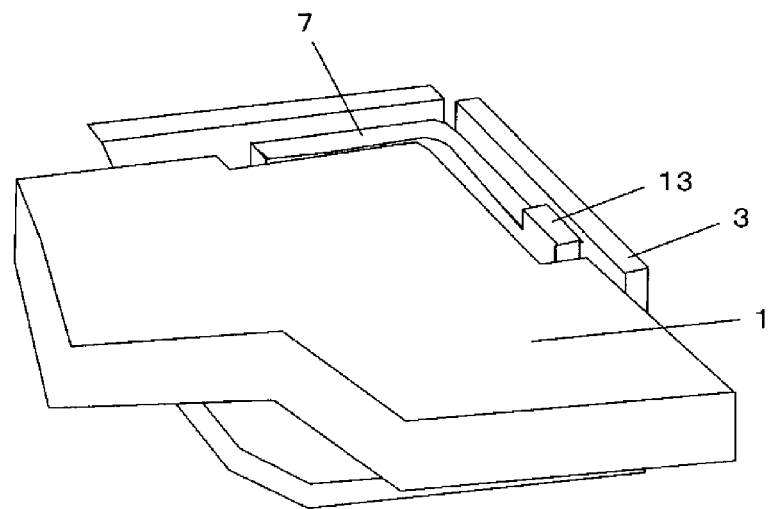
FIG. 11 is a view illustrating an assembly procedure for the optical sheet of the backlight device of the display device according to Embodiment 1 of the present invention.
Figure 12:
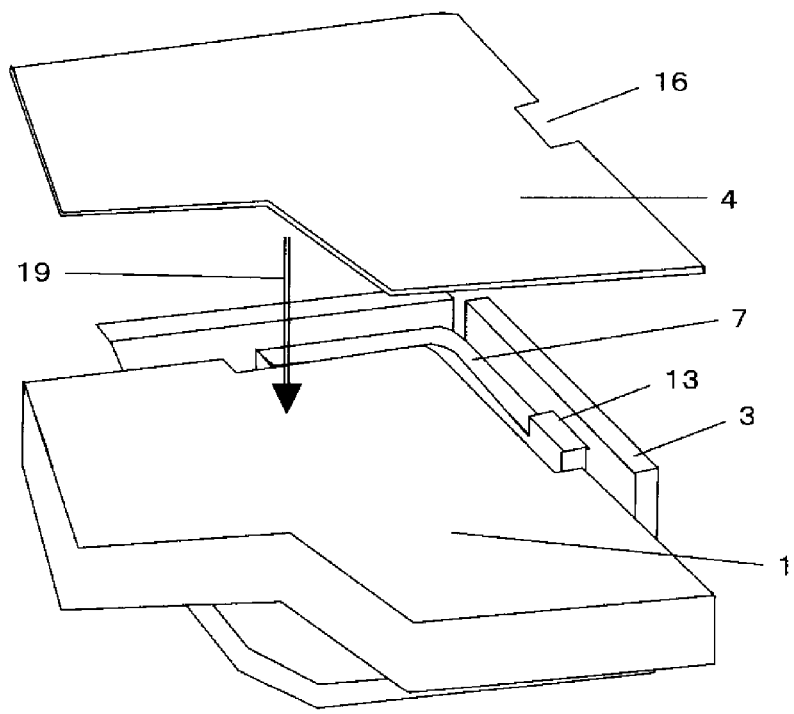
FIG. 12 is a view illustrating an assembly procedure for the optical sheet of the backlight device of the display device according to Embodiment 1 of the present invention.
Figure 13:
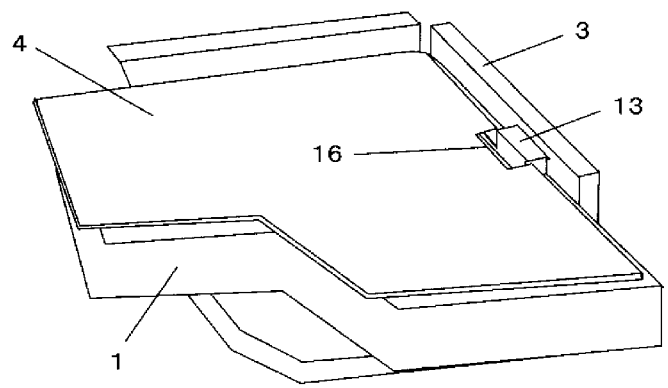
FIG. 13 is a view illustrating an assembly procedure for the optical sheet of the backlight device of the display device according to Embodiment 1 of the present invention.

Next, FIG. 8 to FIG. 13 illustrate views illustrating assembly procedures for the optical sheet of the backlight device of the display device according to Embodiment 1 of the present invention. Hereinafter, with reference to FIG. 8 to FIG. 13, the detailed configuration of the optical sheet of the backlight device according to Embodiment 1 is described. Note that, FIG. 8 to FIG. 10 are enlarged views of the corner portion on the side on which the first locking member 5 is arranged, and FIG. 11 to FIG. 13 are enlarged views of the corner portion on the side on which the second locking member is arranged.

First, as illustrated in FIG. 8, after the first locking member 5 is arranged at the corner portion of the lower frame 3, the light guide plate 1 is arranged. At this time, in the backlight device according to Embodiment 1, the side wall surface in the lateral direction of the lower frame 3, i.e., the side wall on the left side of FIG. 8 is used as the reference, and hence the light guide plate 1 arranged in the lower frame 3 is moved in a direction indicated by an arrow 17 of FIG. 8, i.e., in a direction of the side wall of the lower frame 3, to thereby be pressed onto the inner surface of the side wall. Owing to this pressing of the light guide plate 1 in the direction of the arrow 17, the first locking member 5 is fixed on the corner portion of the lower frame 3.

Next, as illustrated in FIG. 9, from the top surface side (illumination surface side illuminated with the backlight) of the lower frame 3, the optical sheet 4 is arranged on the light guide plate 1 as indicated by an arrow 18. At this time, in the backlight device according to Embodiment 1, the first locking member 5 is fixed on the corner portion of the lower frame 3. Therefore, the optical sheet 4 is arranged so that the first protrusion 11 formed on the first locking member 5 and the cut-out recess 14 are fitted to each other and the second protrusion 12 and the recess 15 are fitted to each other. In this manner, the optical sheet 4 is positioned at the angled corner portion of the lower frame 3.

FIG. 10 illustrates a state after arrangement of the optical sheet 4. As is apparent from FIG. 10, on one angled corner portion on the side on which the first locking member 5 is arranged, the optical sheet 4 is fixed at a predetermined position with the first protrusion 11 and the second protrusion 12 formed on the first locking member 5. At this time, as described above, the optical sheet 4 is fixed in both the longitudinal direction and the lateral direction of the backlight device. Further, after that, in the backlight device according to Embodiment 1, the upper frame (not shown) that is formed to include a frame portion covering an outer peripheral portion of the optical sheet 4 is fitted to the lower frame 3. Owing to this arrangement of the upper frame, the first protrusion 11 and the second protrusion 12, and upper end surfaces of the lower frame 3 are brought into contact with inner side surfaces of the frame portion of the upper frame, thereby preventing the positional shift of the optical sheet 4. Note that, the first protrusion 11 and the second protrusion 12, and the upper end surfaces of the lower frame 3 and the inner side surfaces of the frame portion of the upper frame may be formed with a clearance smaller than the thickness of the optical sheet 4.

Meanwhile, as illustrated in FIG. 11, the second locking member 7 is fixed directly to the lower frame 3, and the side wall on the short side of the second locking member 7 and the light guide plate 1 are separated from each other. At this time, in Embodiment 1, the short side sharing the corner portion at which the first locking member 5 is arranged is used as the reference, and the light guide plate 1 is arranged close to the long side on which the first locking member 5 and the second locking member 7 are arranged. Note that, a positioning position of the light guide plate 1 with respect to the lower frame 3 is not limited to the long side on which the first locking member 5 and the second locking member 7 are arranged, and may be a side opposed to the long side on which the first locking member 5 and the second locking member 7 are arranged.

Further, as illustrated in FIG. 12, from the top surface side of the lower frame 3, the optical sheet 4 is arranged on the light guide plate 1 as indicated by an arrow 19. At this time, in the backlight device according to Embodiment 1, the second locking member 7 is fixed on another angled corner portion of the lower frame 3, and hence the optical sheet 4 is arranged so that the third protrusion 13 formed on the second locking member 7 and the cut-out recess 16 are fitted to each other. In this manner, the optical sheet 4 is positioned at the another angled corner portion of the lower frame 3.

FIG. 13 illustrates a state after arrangement of the optical sheet 4. As is apparent from FIG. 13, on the another angled corner portion on which the second locking member 7 is arranged, the positional shift of the optical sheet 4 in an up-down direction (lateral direction) is fixed by the third protrusion 13 formed on the second locking member 7. For fixing of the optical sheet 4 at this time, similarly to the case of the side on which the first locking member 5 is arranged, the side corresponding to the one angled corner portion, the upper frame (not shown) that is formed to include the frame portion covering the outer peripheral portion of the optical sheet 4 is fitted to the lower frame 3. Thus, owing to this arrangement of the upper frame, the third protrusion 13 and the upper end surface of the lower frame 3 are brought into contact with the inner side surface of the frame portion of the upper frame, thereby preventing the positional shift of the optical sheet 4. Note that, the third protrusion 13 and the upper end surface of the lower frame 3 and the inner side surface of the frame portion of the upper frame may be formed with a clearance smaller than the thickness of the optical sheet 4.

As described above, in the backlight device of the display device according to Embodiment 1, the light guide plate is arranged on the bottom surface side, and the first locking member 5 provided with the first and second protrusions is arranged on one of the angled corner portions of the box-shaped lower frame that has an open surface opposed to the bottom surface side. Further, the second locking member provided with the third protrusion is arranged on at least one corner portion on the other end side of the side wall portion sharing the one of the angled corner portions. In addition, the optical sheet, which is to be arranged on a light emitting surface side of the light guide plate, is provided with the cut-out recesses to be fitted to the first to third protrusions, and the first and second protrusions fix one end side of the optical sheet on the angled corner portion of the lower frame, whereas the third protrusion fixes the other end side of the optical sheet. Thus, even in a case of sharp temperature change and reception of intense vibration, it is possible to prevent the positional shift of the optical sheet in the extending direction, and to prevent damage of the optical sheet and occurrence of wrinkles.

At this time, in the display device according to Embodiment 1, the first locking member 5 and the second locking member 7 are each formed of a resin member, and hence it is possible to attain such a special effect as to be capable of preventing occurrence of chips of the optical sheet 4 even in a case of application of large vibration.

Note that, in Embodiment 1, the first locking member 5 is sandwiched between the light guide plate 1 and the side walls of the lower frame 3, and hence the first locking member 5 has a height reaching the bottom surface of the lower frame 3. However, for example, in a case where the first locking member 5 is fixed directly to the lower frame 3, the first locking member 5 does not need to have the height reaching the bottom surface of the lower frame 3. Also in this case, the first locking member 5 is fixed to the side walls of the lower frame 3 so that the top surface portion of the first locking member 5 is flush with the top surface of the light guide plate.

Further, in the backlight device according to Embodiment 1, the first locking member 5 is arranged at the angled corner portion on one end side of the long side on the upper side of FIG. 4, whereas the second locking member 7 is arranged at the angled corner portion on the other end side of the long side. However, the arrangement positions of the first locking member 5 and the second locking member 7 are not limited thereto. For example, the second locking member 7 may be arranged at the angled corner portion on the other end side of the short side which is used as a reference position of the light guide plate 1. In addition, the second locking members 7 may be arranged at the angled corner portion on the other end side of the long side and the angled corner portion on the other end side of the short side illustrated in FIG. 4, respectively. However, also in both cases, the second locking member 7 is not arranged at the angled corner portion that is diagonally opposite to the angled corner portion at which the first locking member 5 is arranged, i.e., the angled corner portion that does not share the short side and the long side with the angled corner portion at which the first locking member 5 is arranged.

In addition, in the backlight device according to Embodiment 1, the optical sheet 4 is held at a predetermined position using the first locking member 5 and the second locking member 7, and hence an inward protruding amount from the side wall of the lower frame 3 can be reduced. As a result, in the backlight device according to Embodiment 1, the first locking member 5 and the second locking member 7 can be formed in a light shielding region such as a frame region of the upper frame (not shown), and hence both fixing of the optical sheet and narrowing of the frame can be achieved.

Embodiment 2

Figure 14:
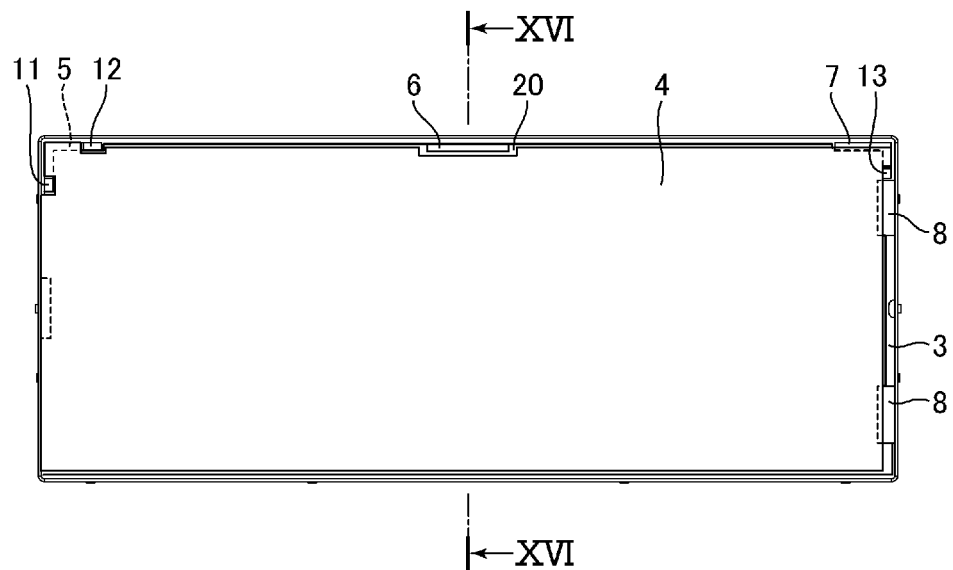
FIG. 14 is a top view illustrating a schematic configuration of a backlight device of a display device according to Embodiment 2 of the present invention.

FIG. 14 is a top view illustrating a schematic configuration of a backlight device of a display device according to Embodiment 2 of the present invention. Note that, the backlight device according to Embodiment 2 has a similar configuration to that of Embodiment 1 except for a configuration of a mold member 6 arranged at a center portion in the longitudinal direction of the backlight device. Therefore, in the following description, the configuration of the mold member 6 is described in detail. Further, in FIG. 14, the upper frame that is fitted to the lower frame 3 to sandwich the optical sheet 4 and the light guide plate 1 from the illumination direction of the backlight is omitted.

As is apparent from FIG. 14, in the backlight device according to Embodiment 2, at the center portion of the side wall of the lower frame 3 in the longitudinal direction on the upper side of FIG. 14, the mold member 6 for supporting the light guide plate 1 from the top surface (illumination surface illuminated with the backlight) is arranged. At this time, a side end portion of the top surface of the mold member 6 is shaped to protrude to the light guide plate 1 side, and hence a cut-out recess 20 for preventing contact with the mold member 6 is formed in the side edge portion of the optical sheet 4 that is arranged on the top surface of the light guide plate 1.

Figure 15:
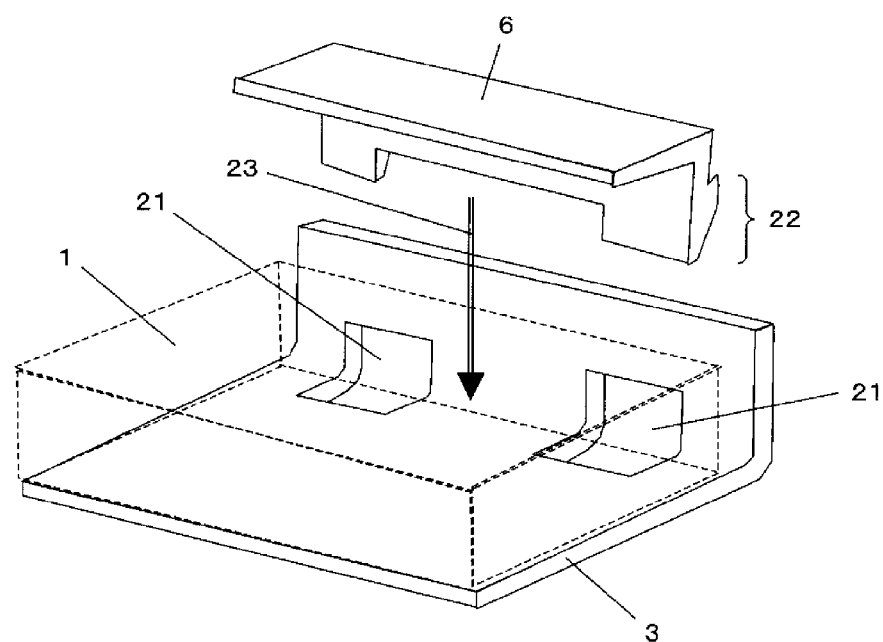
FIG. 15 is a perspective view illustrating a detailed configuration of a mold member provided to the backlight device of the display device according to Embodiment 2 of the present invention.
Figure 16:
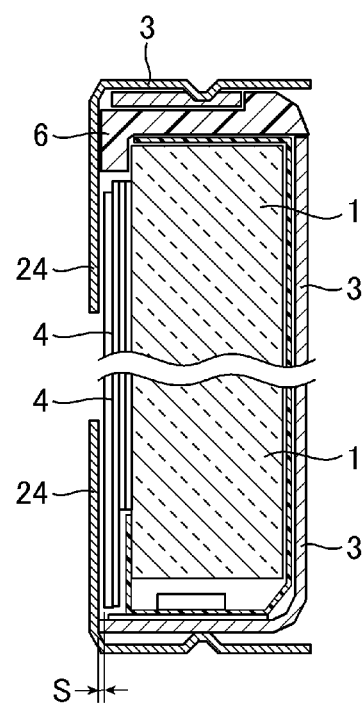
FIG. 16 is a sectional view taken along the line XVI-XVI of FIG. 14.

Next, FIG. 15 is a perspective view illustrating a detailed configuration of the mold member of the backlight device of the display device according to Embodiment 2 of the present invention, and FIG. 16 is a sectional view taken along the line XVI-XVI of FIG. 14. Hereinafter, with reference to FIG. 14 and FIG. 15, the detailed configuration of the mold member according to Embodiment 2 is described.

As illustrated in FIG. 15, the mold member 6 according to Embodiment 2 includes a pressing portion and an insertion portion that are formed integrally, and has a substantially L-shaped cross-section. The pressing portion protrudes toward the light guide plate 1 illustrated by the dotted lines, and the insertion portion is inserted between the light guide plate 1 and the side wall of the lower frame 3. Further, the insertion portion of the mold member 6 according to Embodiment 2 is provided with claw-like fixing portions 22 protruding in a direction opposite to the protruding direction of the pressing portion, that is, protruding to the side wall surface side, and a side surface of the insertion portion has a protruding amount increasing in a tapered manner from the insertion side to the fixing portion 22. In addition, the lower frame 3 according to Embodiment 2 has fixing holes 21 formed therein corresponding to the fixing portions 22. After arrangement of the light guide plate 1, the mold member 6 is inserted from above (illumination surface side) in a direction indicated by an arrow 23 of FIG. 15, thereby fitting the fixing portions 22 and the fixing holes 21 to each other.

FIG. 16 illustrates a state when the light guide plate 1 is fixed by the mold member 6 according to Embodiment 2. As illustrated in FIG. 16, in Embodiment 2, the light guide plate 1 is arranged from the bottom side of the lower frame 3, and the insertion portion of the mold member 6 is inserted between the side surface of the light guide plate 1 and the side wall of the lower frame 3. At this time, the fixing portions 22 formed on one side of the mold member 6 are fitted into the fixing holes 21 of the lower frame 3, and the pressing portion formed on the other side thereof presses the light guide plate 1 in a direction of the bottom surface of the lower frame 3. Note that, the insertion portion of the mold member 6 according to Embodiment 2 is formed to have a thickness smaller than an interval between the lower frame 3 and the light guide plate 1. Further, in the optical sheet 4 to be arranged on the illumination surface side of the light guide plate 1, the cut-out recess for preventing contact with the pressing portion of the mold member 6 is formed, and the side edge portion of the pressing portion and the side edge portion of the optical sheet 4 are arranged apart from each other at a predetermined distance. In addition, an upper frame 24 having a frame-like bottom is fitted from the open surface side of the lower frame 3, i.e., from a side of the opposed surface to the bottom surface, and the light guide plate 1, the optical sheet 4, and the like are held by a frame region of the upper frame 24 at a predetermined interval (with a predetermined clearance).

As described above, in the backlight device according to Embodiment 2, the mold member 6 is arranged on the side surface opposed to the side surface on which the light source (not shown) is arranged, and the light guide plate 1 is fixed by the rubber cushion members 8 arranged on the side surface portion of the light guide plate 1 and the side wall of the lower frame 3. In addition, the mold member 6 prevents the positional shift of the light guide plate 1 in the illumination direction of the backlight. As described above, in Embodiment 2, the mold member 6 is arranged at the center portion in the long side direction, and hence even in a case where large vibration is applied to the backlight device, it is possible to prevent the positional shift, deformation such as distortion, vibration of the light guide plate 1 due to the positional shift or deformation, and the like.

Embodiment 3

Figure 17:
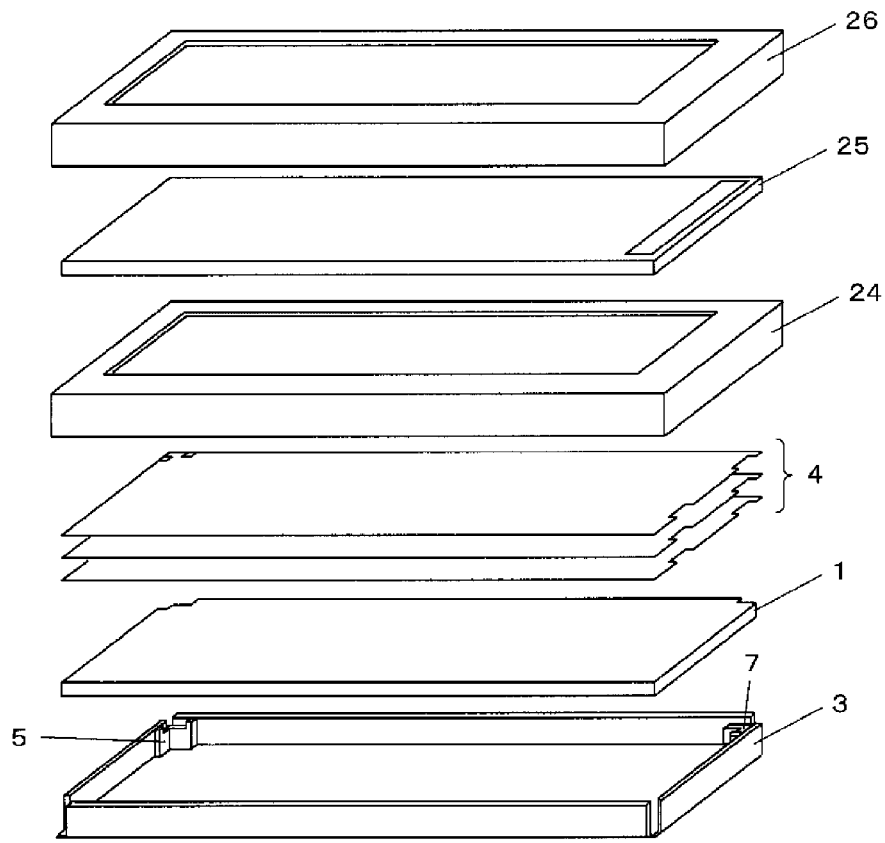
FIG. 17 is an exploded perspective view illustrating an entire configuration of a liquid crystal display device as a display device according to Embodiment 3 of the present invention.
Figure 18:
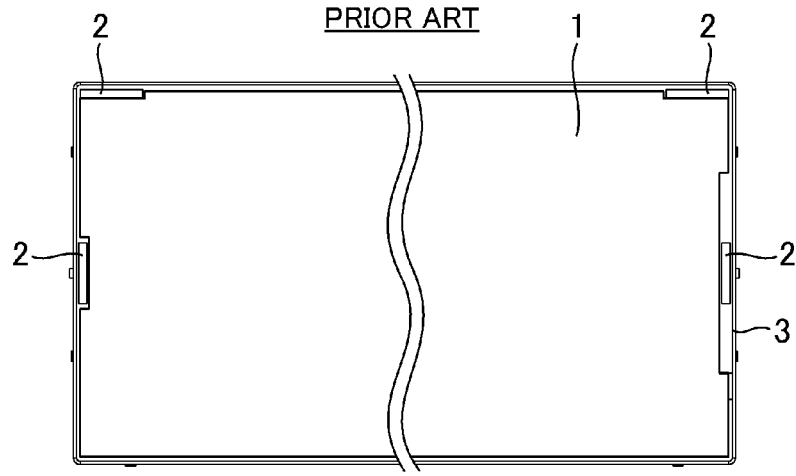
FIG. 18 is a view illustrating a schematic configuration of a light guide plate provided to a backlight device of a conventional display device.
Figure 19:
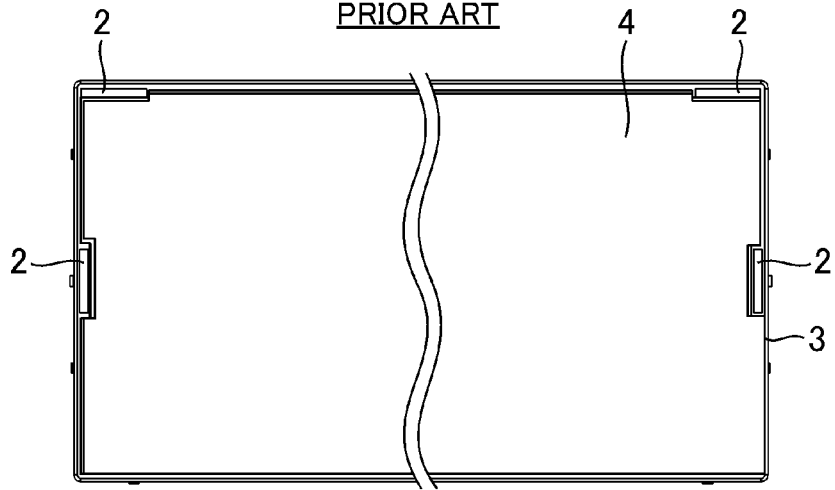
FIG. 19 is a view illustrating a schematic configuration of an optical sheet provided to the backlight device of the conventional display device.
Figure 20:
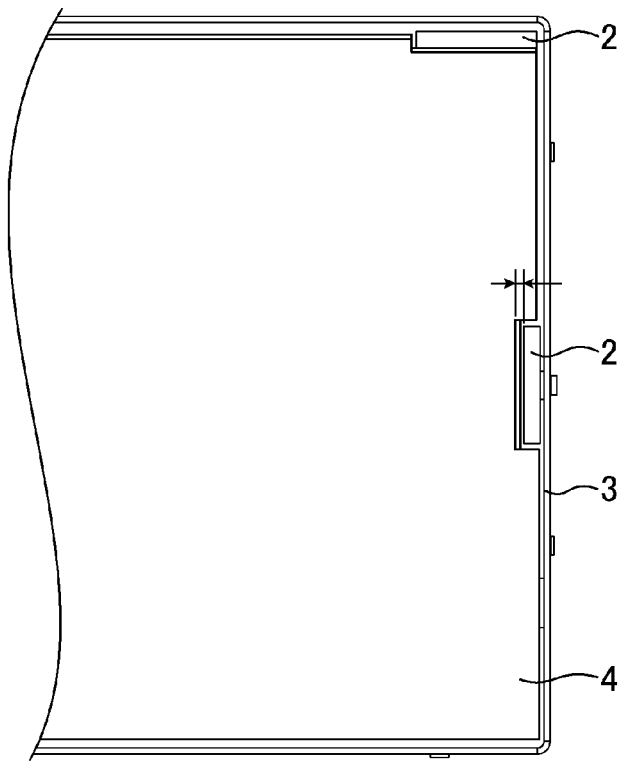
FIG. 20 is an enlarged view illustrating the schematic configuration of the optical sheet provided to the backlight device of the conventional display device.

FIG. 17 is an exploded perspective view illustrating an entire configuration of a liquid crystal display device as a display device according to Embodiment 3 of the present invention. The display device according to Embodiment 3 has a similar configuration to that of a conventional liquid crystal display device except for the configuration of the backlight device. Note that, in the following description, a case of using the backlight device according to Embodiment 1 is described, but the backlight device according to Embodiment 2 is also applicable. Further, also in the following description, for ease of description, a light source, a reflective sheet, and the like, which are provided similarly in the conventional configuration, are omitted.

As illustrated in FIG. 17, the liquid crystal display device according to Embodiment 3 includes: the light guide plate 1 and the plurality of optical sheets 4, which are arranged sequentially; the lower frame 3, which has a surface that is open along the side walls and opposed to a bottom surface portion on which the light guide plate 1 and the optical sheets 4 are arranged; and the upper frame 24, which has an opening formed in a bottom surface portion thereof for allowing illumination of the backlight and has an opposed surface that is open along the side walls and opposed to the bottom surface portion. The upper frame 24 is fitted to the lower frame 3, thereby forming the backlight device. A well-known liquid crystal display panel 25 is arranged on the top surface of the backlight device, i.e., the top surface of the upper frame 24 illustrated in FIG. 17. An outer frame 26, which has an opening formed in a bottom surface portion thereof for allowing output of a display image and has an opposed surface that is open along the side walls and opposed to the bottom surface portion, is fitted to the upper frame 24 so that the upper frame 24 and the outer frame 26 sandwich the liquid crystal display panel 25.

Here, in the liquid crystal display device according to Embodiment 3, the light source (not shown) is arranged on the side wall side opposed to the side wall in the longitudinal direction on which the first locking member 5 and the second locking member 7 are arranged. In addition, a drive circuit and the like of the liquid crystal display panel 25 are arranged on the side wall side in the lateral direction on which the second locking member 7 is arranged, i.e., on the right side of FIG. 17.

As described above, in the liquid crystal display device according to Embodiment 3, the first locking member is arranged at the angled corner portion sharing the long side and the short side at which the light source (not shown) and the drive circuit and the like of the liquid crystal display panel 25 are not arranged, whereas the second locking member 7 is arranged on the short side on which the drive circuit and the like are arranged. Thus, the short side and the long side, which share the angled corner portion at which the first locking member 5 is arranged, can be formed into a narrowed frame.

Note that, the first protrusion and the second protrusion, and the third protrusion may be formed at the angled corner portion of the light guide plate 1.

As described above, the invention made by the inventor of the present invention is described with reference to the embodiments of the invention, but the present invention is not limited to the embodiments of the invention. Various modifications may be made thereto within the scope of the spirit of the invention.

What is claimed is:

1. A display device, comprising:
   a display panel for displaying an image;
   a light guide plate, which is arranged on a back surface side of the display panel, and has one flat surface as a light emitting surface to allow light of a light source entering from an end surface of the light guide plate to be emitted;
   an optical sheet, which is arranged on the light emitting surface side of the light guide plate;
   a frame formed into a box shape with one open surface, for holding the light guide plate and the optical sheet, the frame having a planar shape of a quadrangle having a pair of short sides and a pair of long sides, and including side walls along the quadrangle,
   the side walls including a first angled corner portion and a second angled corner portion,
   the first angled corner portion and the second angled corner portion being respectively positioned at both end portions of one side selected from the pair of short sides and the pair of long sides;
   a first protrusion formed inside the first angled corner portion on one of the pair of short sides;
   a second protrusion formed inside the first angled corner portion on one of the pair of long sides; and
   a third protrusion formed inside the second angled corner portion on a side different from the one side selected from the pair of short sides and the pair of long sides;
   wherein the optical sheet includes a cut-out first recess, a cut-out second recess, and a cut-out third recess, which are to be fitted to the first protrusion, the second protrusion, and the third protrusion, respectively;
   wherein the first protrusion and the second protrusion are formed on a first locking member having an L-shape, and the third protrusion is formed on a second locking member having an L-shape;
   wherein the first locking member and the second locking member each include a flat portion that is flush with the light guide plate; and
   wherein the first protrusion and the second protrusion, and the third protrusion are formed to protrude from the flat portion.

2. The display device according to claim 1, wherein the first protrusion, the second protrusion, and the third protrusion are each formed of a resin member.

3. The display device according to claim 1, wherein the first locking member is sandwiched by inner surfaces of the side walls of the frame and the light guide plate, and the second locking member is fixed onto the inner surfaces of the side walls of the frame.

4. The display device according to claim 1, wherein the first locking member and the second locking member are fixed onto the side walls of the frame.

5. The display device according to claim 1, further comprising an elastic member arranged between the light guide plate and one of the side walls at another one of the pair of short sides that is opposed to the one of the pair of short sides on the first angled corner portion side,
   wherein the light guide plate is pressed and fixed onto another one of the side walls at the one of the pair of short sides on the first angled corner portion side by an elastic force of the elastic member.

6. The display device according to claim 1, wherein the optical sheet is positioned on one of the side walls on the one of the pair of short sides using a side surface of the second protrusion and the one of the side walls on the one of the pair of short sides on which the first protrusion is formed.

7. The display device according to claim 6, wherein the cut-out third recess corresponding to the third protrusion is formed to have a cut-out amount corresponding to an amount of thermal expansion of the optical sheet.

8. A display device, comprising:
   a display panel for displaying an image;
   a light guide plate, which is arranged on a back surface side of the display panel, and has one flat surface as a light emitting surface to allow light of a light source entering from an end surface of the light guide plate to be emitted;
   an optical sheet, which is arranged on the light emitting surface side of the light guide plate;
   a frame formed into a box shape with one open surface, for holding the light guide plate and the optical sheet, the frame having a planar shape of a quadrangle having a pair of short sides and a pair of long sides, and including side walls along the quadrangle,
   the side walls including a first angled corner portion and a second angled corner portion,
   the first angled corner portion and the second angled corner portion being respectively positioned at both end portions of one side selected from the pair of short sides and the pair of long sides;
   a first protrusion formed inside the first angled corner portion on one of the pair of short sides;
   a second protrusion formed inside the first angled corner portion on one of the pair of long sides; and
   a third protrusion formed inside the second angled corner portion on a side different from the one side selected from the pair of short sides and the pair of long sides;
   wherein the optical sheet includes a cut-out first recess, a cut-out second recess, and a cut-out third recess, which are to be fitted to the first protrusion, the second protrusion, and the third protrusion, respectively,
   wherein a first locking member having an L-shape is formed inside the first angled corner;
   wherein a second locking member having an L-shape is formed inside the second angled corner;
   wherein the first locking member and the second locking member each include a flat portion to arrange the optical sheet; and
   wherein the first protrusion and the second protrusion are formed to protrude from the flat portion of the first locking member, and the third protrusion is formed to protrude from the flat portion of the second locking member.

* * * * *